(12) United States Patent
Meng et al.

(10) Patent No.: US 11,360,365 B2
(45) Date of Patent: Jun. 14, 2022

(54) LIGHT MODULATION DEVICE AND SINGLE-CHANNEL SPECTRUM DETECTION SYSTEM

(71) Applicant: BOE Technology Group Co., Ltd., Beijing (CN)

(72) Inventors: Xiandong Meng, Beijing (CN); Wei Wang, Beijing (CN); Xianqin Meng, Beijing (CN); Jifeng Tan, Beijing (CN); Fangzhou Wang, Beijing (CN); Qiuyu Ling, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 64 days.

(21) Appl. No.: 16/955,514

(22) PCT Filed: Nov. 6, 2019

(86) PCT No.: PCT/CN2019/115931
§ 371 (c)(1),
(2) Date: Jun. 18, 2020

(87) PCT Pub. No.: WO2020/098540
PCT Pub. Date: May 22, 2020

(65) Prior Publication Data
US 2021/0011314 A1   Jan. 14, 2021

(30) Foreign Application Priority Data
Nov. 16, 2018  (CN) .......................... 201811365960.2

(51) Int. Cl.
*G02F 1/137*   (2006.01)
*G01N 21/31*   (2006.01)
(Continued)

(52) U.S. Cl.
CPC ............. *G02F 1/137* (2013.01); *G01N 21/31* (2013.01); *G01N 21/85* (2013.01); *G02F 1/1337* (2013.01);
(Continued)

(58) Field of Classification Search
None
See application file for complete search history.

(56) References Cited

U.S. PATENT DOCUMENTS

| | | | |
|---|---|---|---|
| 2009/0323194 A1 | 12/2009 | Lin et al. | |
| 2015/0362794 A1* | 12/2015 | Pang ................. | G02F 1/136204 359/891 |

(Continued)

FOREIGN PATENT DOCUMENTS

| | | | | |
|---|---|---|---|---|
| CN | 101652652 A | * | 2/2010 | ......... G01N 21/0303 |
| CN | 101652652 A | | 2/2010 | |

(Continued)

OTHER PUBLICATIONS

English translation of CN-107167925-A, Title: A Holographic Grating Backlight Structure Of Field Sequential Three-dimensional Display, Author: Zhang, Yu-ning; Liu, Ao; Weng, Yi-shi; Shen, Zhong-wen; Date of publication: Sep. 15, 2017 (Year: 2017).*

(Continued)

*Primary Examiner* — Shan Liu
(74) *Attorney, Agent, or Firm* — Nath, Goldberg & Meyer; Joshua B. Goldberg (57) ABSTRACT

A light modulation device and a single-channel spectrum detection system are provided. The light modulation device includes: a light guide plate; a dispersing component configured to disperse received light into light of different wavelengths and to diffract the light of different wavelengths into the light guide plate at different angles; and a dynamic filtering component configured to prevent light of a selected (Continued)

wavelength in the light guide plate from entering the dynamic filtering component such that the light of the selected wavelength emits out from the light guide plate, and to make light of non-selected wavelengths in the light guide plate enter the dynamic filtering component such that the light of the non-selected wavelengths is filtered out from the light guide plate.

20 Claims, 3 Drawing Sheets

(51) Int. Cl.
*G01N 21/85* (2006.01)
*G02F 1/1335* (2006.01)
*G02F 1/1337* (2006.01)

(52) U.S. Cl.
CPC .. *G02F 1/133504* (2013.01); *G02F 1/133512* (2013.01); *G02F 1/133524* (2013.01); *G01N 2201/0635* (2013.01); *G01N 2201/0638* (2013.01); *G01N 2201/08* (2013.01); *G02F 2203/055* (2013.01)

(56) References Cited

U.S. PATENT DOCUMENTS

| | | | | |
|---|---|---|---|---|
| 2018/0172893 A1* | 6/2018 | Fattal | .................... | G02B 6/0035 |
| 2019/0146221 A1* | 5/2019 | Oku | ...................... | G02B 6/0026 359/13 |
| 2020/0386937 A1* | 12/2020 | Li | ........................ | G02B 6/0068 |

FOREIGN PATENT DOCUMENTS

| | | | | |
|---|---|---|---|---|
| CN | 104076518 | A | * | 10/2014 |
| CN | 104076518 | A | | 10/2014 |
| CN | 104704423 | A | | 6/2015 |
| CN | 106292052 | A | | 1/2017 |
| CN | 206074956 | U | * | 4/2017 |
| CN | 106662700 | A | | 5/2017 |
| CN | 107167925 | A | | 9/2017 |
| CN | 107167925 | A | * | 9/2017 |
| CN | 107390418 | A | | 11/2017 |
| CN | 108027532 | A | | 5/2018 |
| CN | 108319070 | A | | 7/2018 |
| CN | 109343243 | A | | 2/2019 |
| EP | 2924481 | A1 | | 9/2015 |
| JP | 11174270 | A | | 7/1999 |
| JP | 2006284633 | A | | 10/2006 |
| WO | 2005059528 | A1 | | 6/2005 |
| WO | 2008059319 | A1 | | 5/2008 |

OTHER PUBLICATIONS

English translation of CN-104076518-A, Title: A Novel Pixel Structure For Three-dimensional Dynamic Display, Author: Gao, Wu-ran; Li, Yan; Chen, Chao-ping; Su, YiKai; Date of publication:Oct. 1, 2014 (Year: 2014).*

English translation of CN-206074956-U, Title: Display Device, Author: Wang, Wei; Yang, Ya-feng; Chen, Xiao-chuan; Zhao, Wen-qing; Li, Zhong-xiao; Tan, Ji-feng; Meng, Xian-qin; Date of publication: Apr. 5, 2017 (Year: 2017).*

English translation of CN-101652652-A, Title: Droplet Execution Devices, Configurations, And Methods For Improving Absorbance Detection, Author: Srinivasan, Vijay; Pamula, Vamsee K; Pollack, Michael G; Wang, Tih-Hong; Date of publication: (Year: 2010).*

First Office Action with Search Report dated Apr. 2, 2020 corresponding to Chinese application No. 201811365960.2.

* cited by examiner

LIGHT MODULATION DEVICE AND SINGLE-CHANNEL SPECTRUM DETECTION SYSTEM

CROSS-REFERENCE TO RELATED APPLICATIONS

This is a National Phase Application filed under 35 U.S.C. 371 as a national stage of PCT/CN2019/115931, filed Nov. 6, 2019, an application claiming the benefit of Chinese Application No. 201811365960.2, filed Nov. 16, 2018, the content of each of which is hereby incorporated by reference in its entirety.

TECHNICAL FIELD

The present disclosure relates to the field of optical technology, and particularly relates to a light modulation device and a single-channel spectrum detection system.

BACKGROUND

In the related art, a spectrum detection device has a plurality of light outlets at fixed positions, and each light outlet is provided with a corresponding microfluidic channel. Each of the plurality of light outlets at the fixed positions is configured to emit light of one wavelength toward the corresponding channel. The light of different wavelengths is output from the plurality of light outlets at the fixed positions, respectively, and thus a plurality of microfluidic channels are required. The different microfluidic channels perform detection by using the light of different wavelengths.

SUMMARY

In an aspect of the present disclosure, a light modulation device is provided, which includes: a light guide plate; a dispersing component configured to disperse received light into light of different wavelengths and to diffract the light of different wavelengths into the light guide plate at different angles; and a dynamic filtering component configured to prevent light of a selected wavelength in the light guide plate from entering the dynamic filtering component such that the light of the selected wavelength emits out from the light guide plate, and to make light of non-selected wavelengths in the light guide plate enter the dynamic filtering component such that the light of the non-selected wavelengths is filtered out from the light guide plate.

In some embodiments, the dynamic filtering component includes: a first electrode, a second electrode, a first grating layer and liquid crystal molecules, wherein the first grating layer is between the first electrode and the second electrode, and the liquid crystal molecules are filled in a gap formed by the first electrode, the second electrode and the first grating layer.

In some embodiments, the dispersing component includes a second grating layer.

In some embodiments, a period of the second grating layer is calculated by:

$$n_1 \sin \theta_1 - n_2 \sin \theta_2 = m\lambda/P$$

where $n_1$ is a refractive index of a medium where the light is located before entering the second grating layer, $n_2$ is a refractive index of the light guide plate, $\theta_1$ is an incident angle of the light with respect to the second grating layer before the light enters the second grating layer, $\theta_2$ is a diffraction angle of the light in the light guide plate, m is a diffraction order, $\lambda$ is a wavelength of any monochromatic light in the light entering the second grating layer, and P is the period of the second grating layer.

In some embodiments, a refractive index of a material of the first grating layer is equal to a refractive index along a long axis of each of the liquid crystal molecules, In some embodiments, the light modulation device further includes: a first light absorption layer on a side of the dynamic filtering component distal to the light guide plate to absorb the light of the non-selected wavelengths in the light guide plate.

In some embodiments, the first light absorption layer is a black material layer.

In some embodiments, the light guide plate has a first surface and a second surface opposite to each other, and the dynamic filtering component is on one of the first surface and the second surface, and the dispersing component is on the other of the first surface and the second surface and is proximal to an end of the light guide plate.

In some embodiments, the dispersing component and the dynamic filtering component are on a same surface of the light guide plate.

In some embodiments, the light modulation device further includes a second light absorption layer which is a black material layer and is on an end surface of the light guide plate proximal to the dispersing component.

In some embodiments, the light modulation device further includes a protective substrate between the first light absorption layer and the first electrode.

In some embodiments, the light modulation device further includes a first alignment layer and a second alignment layer, wherein, the first alignment layer is on a side of the first electrode proximal to the liquid crystal molecules, the second alignment layer is on a side of the second electrode proximal to the liquid crystal molecules, and the first grating layer is between the first alignment layer and the second alignment layer.

In some embodiments, the light modulation device further includes a collimated light source on a side of the dispersing component distal to the light guide plate.

In another aspect, a single-channel spectrum detection system is provided, which includes the light modulation device above, and a detection device; wherein the detection device is on a side of the light modulation device that emits out the light of the selected wavelength.

In some embodiments, the detection device includes: a light diffraction component, a detection component and a single fluid channel respectively at one end of the light guide plate distal to the dispersing component; the light diffraction component is on one surface of the first surface and the second surface of the light guide plate, the detection component and the single fluid channel are on the other surface of the first surface and the second surface of the light guide plate, the single fluid channel is between the detection component and the other surface of the light guide plate, and the light diffraction component is configured to collimate and emit the light of the selected wavelength propagating in the light guide plate onto the single fluid channel and the detection component; and the detection component is configured to detect the light of selected wavelength passing through a microfluid in the single fluid channel.

In some embodiments, the light diffraction component includes a third grating layer.

In some embodiments, a period of the third grating layer is equal to a period of the second grating layer.

In some embodiments, a material of each of the third grating layer and the second grating layer includes a dielectric material or a metallic material, and a material of the first grating layer includes a dielectric material.

In some embodiments, the single fluid channel includes: a first hydrophobic layer and a second hydrophobic layer, wherein the first hydrophobic layer and the second hydrophobic layer are spaced apart from each other to form a channel therebetween, and wherein the first hydrophobic layer is on a surface of the light guide plate, and the second hydrophobic layer is on a side of the detection component proximal to the light guide plate.

In some embodiments, the detection device further includes: a protective layer covering the light diffraction component; and a carrier substrate on a side of the detection component distal to the light guide plate.

DETAILED DESCRIPTION

In order to make one of ordinary skill in the art better understand the technical solutions of the present disclosure, the following detailed description is given with reference to the accompanying drawings and exemplary embodiments.

Unless otherwise defined, technical terms or scientific terms used in the present disclosure should have the ordinary meaning as understood by one of ordinary skill in the art to which the present disclosure belongs. Terms such as "first", "second", and the like used herein do not denote any order, quantity, or importance, but to distinguish one component from another. The words "include", "comprise", or the like, mean that the component or item preceding each of the words, contains the component or item listed after the word and equivalents thereof, but do not exclude additional components or items. Terms such as "upper", "lower", "left", "right", and the like are used only for indicating relative positional relationships, and when the absolute position of the object being described is changed, the relative positional relationships may also change accordingly.

The inventors of the present inventive concept found that, when a spectrum detection device having a plurality of light outlets at fixed positions is used for detecting a microfluid of a certain kind, the microfluid needs to be controlled to move in a plurality of channels, so that the microfluid reaches a corresponding channel. However, operation for controlling the movement of the microfluid in the plurality of channels is complicated, and the precise control of a flow path of the microfluid in the plurality of channels is still problematic, so that a final detection result may be inaccurate.

It is therefore desirable to provide a light modulation device, a wavelength of light output from a light outlet of which may be dynamically adjustable, and a single-channel spectrum detection system including the light modulation device.

Figure 1:
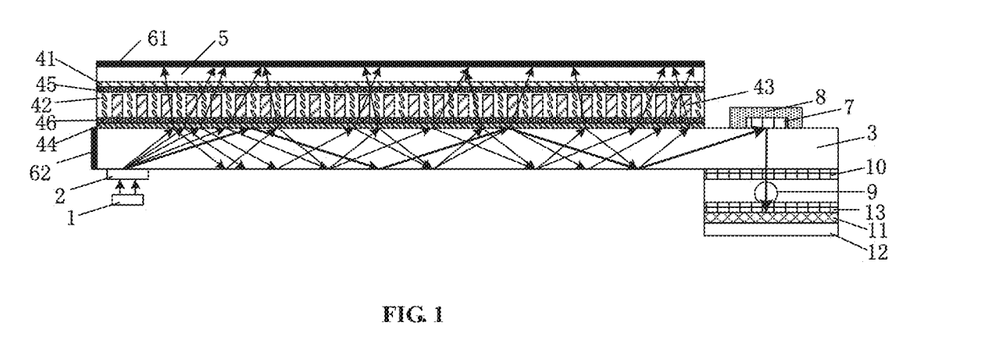
FIG. 1 is a schematic diagram of a structure of a single-channel spectrum detection system according to an embodiment of the present disclosure.
Figure 2:
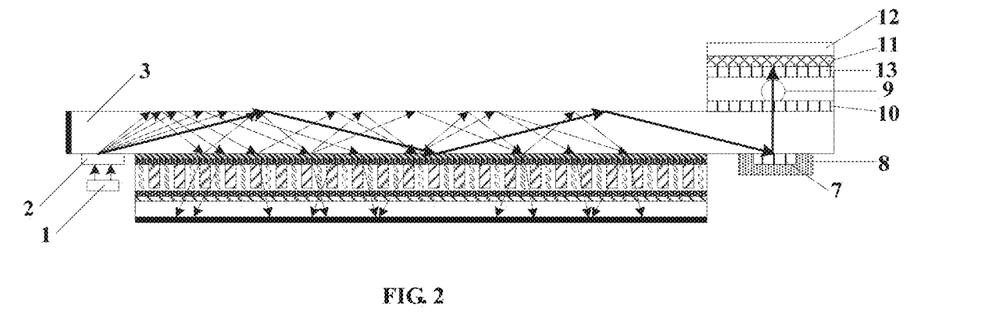
FIG. 2 is a schematic diagram of a structure of a single-channel spectrum detection system according to an embodiment of the present disclosure.
Figure 5:
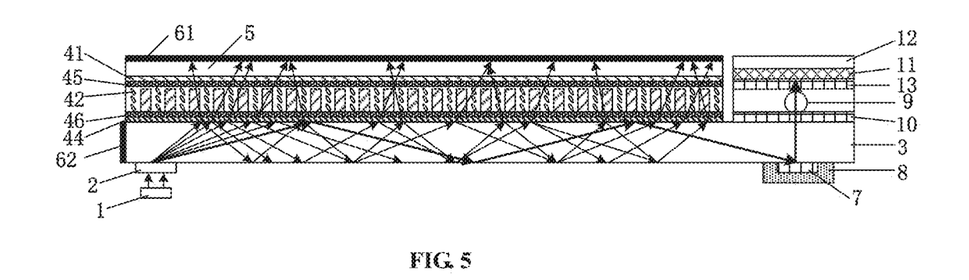
FIG. 5 is a schematic diagram of a structure of a single-channel spectrum detection system according to an embodiment of the present disclosure.
Figure 6:
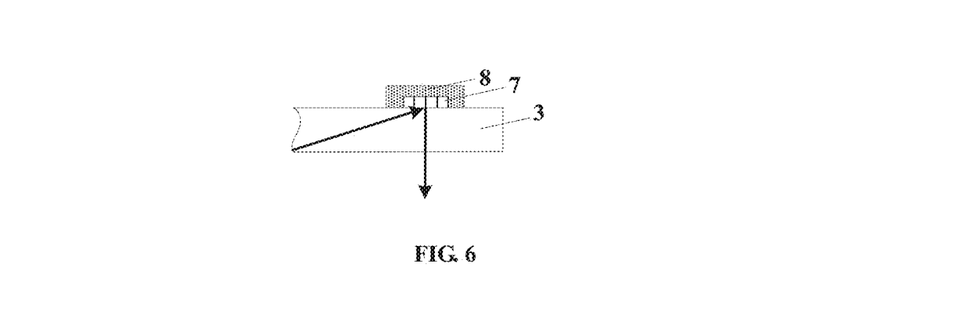
FIG. 6 is a schematic diagram illustrating that a light diffraction component diffracts light of a selected wavelength according to an embodiment of the present disclosure.

According to embodiments of the present disclosure (as shown in FIGS. 1, 2, and 5), there is provided a light modulation device including: a light guide plate 3, a dispersing component 2 and a dynamic filtering component. The dispersing component 2 is configured to receive the light emitted from a light source 1 and disperse the received light into light of a plurality of different wavelengths, so as to diffract the light of the plurality of different wavelengths into the light guide plate 3 at different angles. The dynamic filtering component is configured such that light of selected wavelengths in the light guide plate 3 does not enter the dynamic filtering component and emits out from the light guide plate 3, and light of non-selected wavelengths in the light guide plate 3 enters the dynamic filtering component to be filtered out from the light guide plate 3.

Since the light modulation device provided in the present embodiment includes the dynamic filtering component, the light of selected wavelength may be selected by the dynamic filtering component and not pass through the dynamic filtering component to emit out from the light guide plate 3. Meanwhile, the dynamic filtering component selects (or allows) the light of non-selected wavelengths (i.e. the light except for the light of selected wavelength in the light guide plate 3) to enter therein and then filters the light out from the light guide plate 3. Thus, the light modulation device of the present embodiment may dynamically adjust the wavelength of the light emitted from the light guide plate 3.

In the following embodiments, description is made by taking an example in which the light source 1 is a collimated white light source, the dispersing component 2 disperses light emitted from the white light source, and the obtained light of different wavelengths includes red light, green light and blue light. Of course, the present disclosure is not limited thereto. For example, the light source 1 in the present embodiment may also be one emitting broad-spectrum monochromatic light such as red light having a wavelength of about 600 nm to 700 nm, green light having a wavelength of about 490 nm to 530 nm, blue light having a wavelength of about 400 nm to 450 nm, or the like.

It is assumed that light of a specific wavelength (i.e., selected light) is red light, and light of the other wavelengths (non-selected light) is green light and blue light.

Hereinafter, a structure of the light modulation device in an embodiment of the present disclosure is further explained.

In some embodiments, as shown in FIG. 1, the light guide plate 3 has a first surface and a second surface that are opposite each other in a direction (i.e., a direction of thickness of the light guide plate 3) perpendicular to an upper surface or a lower surface of the light guide plate 3. The dynamic filtering component is on the first surface (e.g., the upper surface), and the dispersing component 2 is at one end of the second surface (e.g., the lower surface) (as shown in FIG. 1, the dispersing component 2 is at the left end of the second surface).

Specifically, as shown in FIG. 1, the dynamic filtering component includes a first electrode 41, a second electrode 44, a first grating layer (or a first grating) 43, and liquid crystal molecules 42. The first grating layer 43 is between the first electrode 41 and the second electrode 44, and the liquid crystal molecules 42 are filled in gaps formed by the first electrode 41, the second electrode 42, and the first grating layer 43. For example, the liquid crystal molecules 42 are filled in slits of the first grating layer (or the first grating) 43. The first electrode 41 and the second electrode 44 may be planar electrodes opposite to each other. By controlling voltages applied to the first electrode 41 and the second electrode 44, a deflection angle (or rotation angle) of the liquid crystal molecules 42 can be controlled such that the green and blue light (i.e., the non-selected light) in the light guide plate 3 diffracts into the dynamic filtering component, while the red light (i.e., the selected light) cannot enter the dynamic filtering component and finally emits out from the light guide plate 3.

The liquid crystal molecules have different refractive indices for the light of different incident angles. Light irradiated to the liquid crystal molecules at a certain incident angle may be divided into polarized light vibrating perpendicular to a paper surface and polarized light vibrating parallel to the paper surface. For the polarized light vibrating perpendicular to the paper surface, an effective refractive index of each of the liquid crystal molecules with respect to light is equal to a refractive index along a short axis of the liquid crystal molecule. For the polarized light vibrating parallel to the paper surface, an effective refractive index of the liquid crystal molecule with respect to the light is equal to a refractive index along a long axis of the liquid crystal molecule only when the long axis of the liquid crystal molecule and the propagation direction of the light of selected wavelength are perpendicular to each other, and at this time the first grating layer 43 can be turned off (i.e., the light cannot pass through the first grating layer 43). When the propagation directions of the light of other wavelengths are not perpendicular to the long axis of each of the liquid crystal molecules, an equivalent refractive index of each of the liquid crystal molecules with respect to the light may not be equal to the refractive index along the long axis of the liquid crystal molecule, and thus the first grating layer 43 is always on (i.e., the light passes through the first grating layer 43). Therefore, by controlling the voltages applied to the first electrode 41 and the second electrode 44 to make the liquid crystal molecules in different deflection states (or rotation states), the matching with the propagation angles of the light of selected wavelength may be realized, thereby realizing the dynamic selection of the light.

An effective refractive index of the first grating layer 43 for all polarized light, which propagates in the light guide plate 3 and vibrates perpendicular to the paper surface, is equal to the refractive index along the short axis of each of the liquid crystal molecules, and the refractive index along the short axis of each of the liquid crystal molecules is not equal to the refractive index of the first grating layer 43, so that all light vibrating perpendicular to the paper surface can be extracted out of the light guide plate 3 by the first grating layer 43. Since the slits of first grating layer 43 are filled with the liquid crystal molecules and it is favorable for allowing the light of non-selected wavelengths to pass through the first grating layer 43, the refractive index of a material of the first grating layer 43 should be equal to the refractive index along the long axis of each of the liquid crystal molecules. Therefore, in some embodiments, the light of selected wavelength propagates in the light guide plate 3 in a direction perpendicular to the long axis of each of the liquid crystal molecules 42, so that the light of selected wavelength remains in the light guide plate 3, propagates to one end of the light guide plate 3 by total internal reflection in the light guide plate 3, and finally emits out from the one end of the light guide plate 3. Also, the first grating layer 43 may be a step grating, which is made of a dielectric material but cannot be made of a metal.

Alternatively, by changing the type of a material of the liquid crystal molecules, the dispersing component and the dynamic filtering component, it is also possible to set the propagation direction of the light of selected wavelength in the light guide plate 3 to be perpendicular to the short axis of each of the liquid crystal molecules 42, so that only the light having a propagation direction perpendicular to the short axis of each of the liquid crystal molecules 42 remain in the light guide plate 3 and cannot enter the dynamic filtering component.

In some embodiments, the light source 1 of the light modulation device is on a side of the dispersing component 2 distal to the light guide plate 3 for emitting light into the dispersing component 2.

In some embodiments, as shown in FIG. 1, the dispersing component 2 includes a second grating layer (i.e. a second grating). After the collimated white light emitted from the light source 1 is diffracted and modulated by the second grating layer, the transmission direction of the collimated white light is changed and the collimated white light is coupled into the light guide plate 3 for total internal reflection propagation. By using wavelength sensitivity of the grating, the collimated white light enters the light guide plate 3 and is dispersed into a spectrum, and the transmission angles of the light of different wavelengths are different.

The period of the second grating layer can be calculated by the following formula:

$$n_1 \sin \theta_1 - n_2 \sin \theta_2 = m\lambda/P$$

where n1 is a refractive index of the medium (e.g., air) where the light is located before entering the second grating layer; n2 is a refractive index of the light guide plate 3; $\theta_1$ is an incident angle of the light with respect to the second grating layer before entering the second grating layer (e.g., an incident angle between the incident light and a normal of the second grating layer); $\theta_2$ is a diffraction angle of the light in the light guide plate 3 (e.g., an angle between the light ray and a thickness direction of the light guide plate 3); m is a diffraction order, typically is +1 or −1; λ is a wavelength of the light, and for example, may be a central wavelength of the light (light emitted from the light source 1) entering the second grating layer or a wavelength of each monochromatic light in the light emitted from the light source 1; and P is the period of the second grating layer.

The period P of the second grating layer is a key parameter of the light modulation device, and other parameters of the second grating layer can be obtained by optimization condition that the structural parameters of the grating are invariable, the light of different wavelengths in the collimated light corresponds to different diffraction angles $\theta_2$. By using this function of the grating, the collimated light can be color-separated into light with different wavelengths which have different transmission angles in the light guide plate.

In the embodiment, the first electrode 41 may be formed as one piece, and the second electrode 44 may be formed as one piece. This configuration can simplify the manufacturing process of the light modulation device of the present embodiment.

It will be appreciated that, in some embodiments, the aforementioned light modulation device is further provided with: a first alignment layer 45 and a second alignment layer 46. Specifically, as shown in FIG. 1, the first alignment layer 45 is on a side of the first electrode 41 proximal to the liquid crystal molecules 42, the second alignment layer 46 is on a side of the second electrode 44 proximal to the liquid crystal molecules 42, and the first grating layer 43 is between the first alignment layer 45 and the second alignment layer 46. The first alignment layer 45 and the second alignment layer 46 cooperate with each other to adjust the arrangement of the liquid crystal molecules 42 therebetween. Further, to simplify the structure of the light modulation device of the present embodiment, the first alignment layer 45 may be formed as one piece, and the second alignment layer 46 may be formed as one piece.

In some embodiments, the light modulation device is further provided with a first light absorption layer 61 on a side of the dynamic filtering component distal to the light guide plate 3 for absorbing the light of non-selected wavelengths filtered out by the dynamic filtering component. In one specific example, the first light absorption layer 61 may be a black material layer (e.g., a black resin). However, the present disclosure is not limited thereto. For example, the light absorption layer 6 may be a light absorption layer made of other materials.

In some embodiments, as shown in FIG. 1, a second light absorption layer 62 is further provided on a third surface of the light guide plate 3 to prevent light from emitting out from the surface (i.e., a side surface) of the light guide plate 3. The third surface is the end surface of the light guide plate 3 proximal to the dispersing component 2. For example, the third surface refers to a side surface between the first and second surfaces of the light guide plate 3 and proximal to the dispersing component 2 (e.g., the left side surface of the light guide plate 3 shown in FIG. 1). The second light absorption layer 62 may be a black material layer.

It should be noted that, in order to avoid a situation that the filtering effect of the dynamic filtering device is affected due to a direct contact between the first light absorption layer 61 and the dynamic filtering component, a protective substrate 5 is provided between the first light absorption layer 61 and the first electrode 41 of the dynamic filtering device in some embodiments, as shown in FIG. 1. The protective substrate 5 may be a glass substrate.

In some embodiments, as shown in FIG. 2, the dispersing component 2 and the dynamic filtering component may be arranged on a same surface of the light guide plate 3.

It should be noted that, in fact, the light modulation device of the present embodiment has a same structure as the light modulation device described above. In contrast, the dispersing component 2 and the dynamic filtering component of the present embodiment are on a same surface of the light guide plate 3. As shown in FIG. 2, both the dispersing component 2 and the dynamic filtering component are on the lower surface of the light guide plate 3. Thus, after the light emitted from the white light source 1 is dispersed into red light, green light and blue light by the dispersing component 2, the light of the three colors is filtered by the dynamic filtering component after at least one total internal reflection in the light guide plate 3, which is not repeated here again.

For the purpose of clearly understanding the present disclosure, the operation principle of the light modulation device of the present disclosure is specifically described below.

Firstly, the light emitted from the light source 1 is dispersed into light of a plurality of different wavelengths by the dispersing component 2, and the light of the plurality of different wavelengths are diffracted into the light guide plate 3 at different angles.

Figure 3:
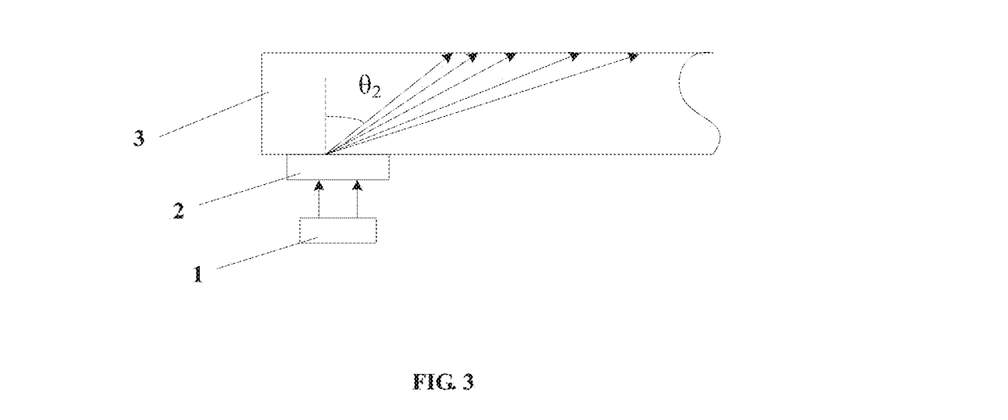
FIG. 3 is a schematic diagram illustrating that a dispersing component disperses light emitted from a collimated light source into light of a plurality of different wavelengths according to an embodiment of the present disclosure.

Specifically, the dispersing component 2 of the present embodiment may include a grating (i.e., the second grating layer) including a plurality of slits arranged at intervals. Thus, when the white light source is collimated and irradiated on the dispersing component 2, the light emitted from the white light source can be dispersed into red light, green light and blue light of different wavelengths. Further, as shown in FIG. 3, according to the wavelength sensitivity of the grating structure, i.e., $n_1 \sin \theta_1 - n_2 \sin \theta_2 = m\lambda/P$ (where n1 is the refractive index of the medium (e.g., air) where the incident light is located before entering (the second grating layer of) the dispersing component 2; n2 is the refractive index of the medium where the diffracted light is located, i.e., the refractive index of the light guide plate 3 here; θ1 is the incident angle of the collimated light emitted from the light source 1 with respect to the dispersing component 2; θ2 is the diffraction angle of the diffracted light within the light guide plate 3; m is the diffraction order, which is generally +1 or −1; λ is the wavelength of the light, which may be selected as the central wavelength of the light emitted from the light source 1; and P is the period of the second grating layer). It can be seen that: when the dispersing component 2 diffracts the red light, the green light and the blue light of different wavelengths into the light guide plate 3, since the red light, the green light and the blue light have different wavelengths λ, the light of the three colors have different diffraction angles θ2 in the light guide plate 3. That is, the dispersing component 2 of the present disclosure can also diffract the red light, the green light and the blue light of different wavelengths into the light guide plate 3 at different angles.

In some embodiments, a material of the grating structure in the dispersing component 2 includes any one of silicon nitride, silicon dioxide, negative photoresist, resin, and metal. The grating structure has a shape of any one of a step grating, an inclined grating and a holographic grating.

Secondly, light of a specific wavelength is selected from the light of different wavelengths by the dynamic filtering component to be emitted out from the light guide plate 3, and the light of the other wavelengths is filtered out from the light guide plate 3.

Red light is taken as the light of specific wavelength, and correspondingly, green light and blue light are the light of the other wavelengths in this example.

Figure 4:
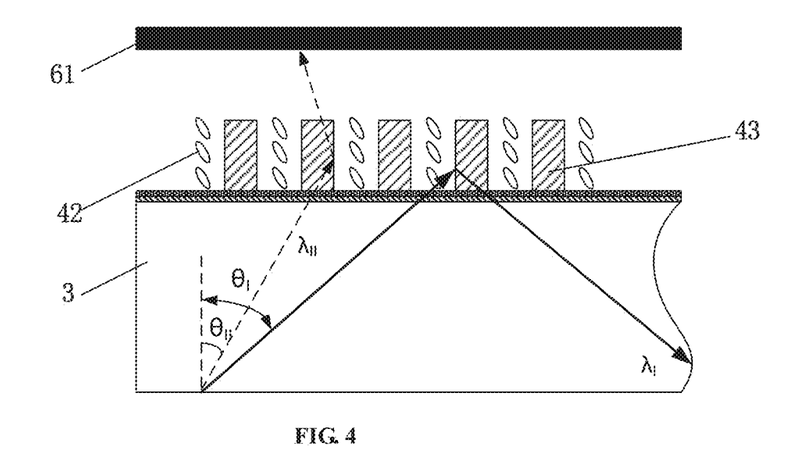
FIG. 4 is a schematic diagram of a dynamic filtering component according to an embodiment of the present disclosure.
Figure 7:
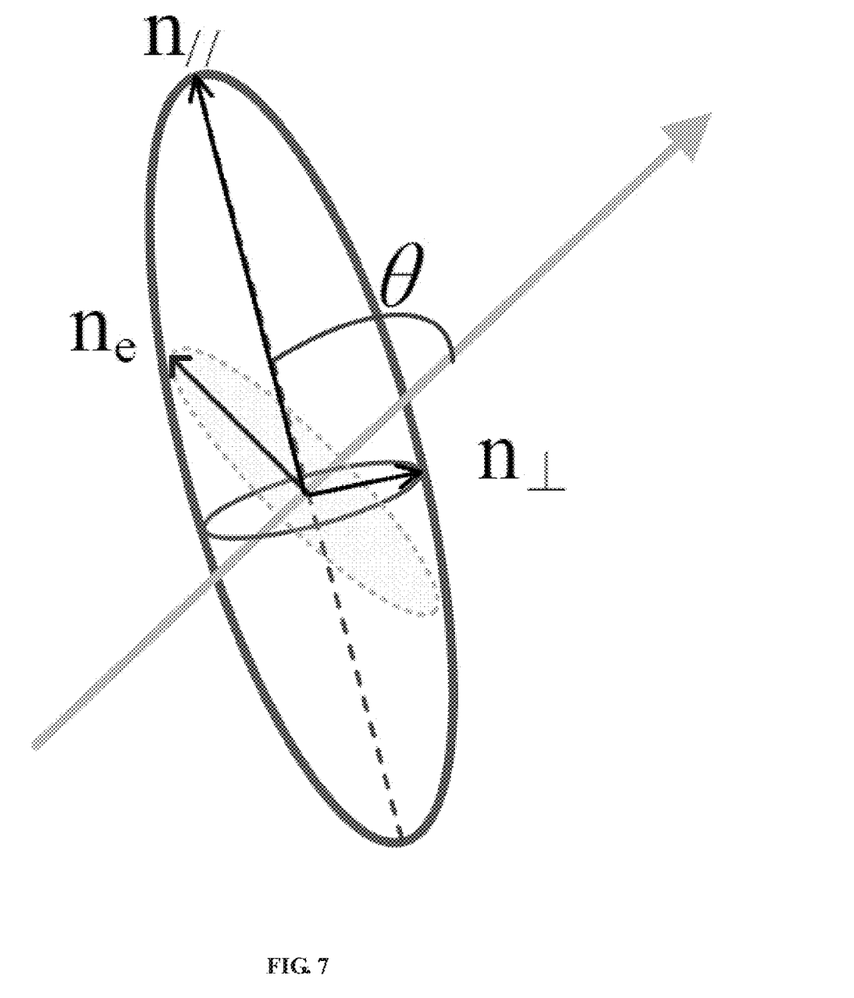
FIG. 7 is a schematic diagram illustrating a relationship between equivalent refractive indexes of a liquid crystal molecule and different incident angles of light.

Specifically, the liquid crystal molecules 42 are controlled to rotate by applying a voltage across the first electrode 41 and the second electrode 44, so that the long axes of the liquid crystal molecules 42 are perpendicular to the propagation direction of the red light (i.e. light of wavelength $\lambda_r$ shown in FIG. 4). A refractive index of the liquid crystal molecules 42 with respect to the light irradiated thereon may be calculated based on the following formula:

$$n_e = \frac{n_\| n_\perp}{\sqrt{n_\|^2 \cos^2\theta + n_\perp^2 \sin^2\theta}}$$

where $n_e$ is the refractive index of the liquid crystal molecules 42 with respect to the light irradiated thereon; $n_\|$ is the refractive index along the long axis of each of the liquid crystal molecules 42; $n_\perp$ is the refractive index along the short axis of each of the liquid crystal molecule 42; θ is the angle between the propagation direction of the light of different wavelengths (as shown by the arrows in FIG. 7) and the long axis of the liquid crystal molecule 42, as shown in FIG. 7. In a case where an appropriate voltage is applied across the first electrode 41 and the second electrode 44 to drive the liquid crystal molecules 42 to rotate so that the long axes of the liquid crystal molecules 42 are perpendicular to the propagation direction of the red light, i.e., in a case where θ is 90 degrees, $n_e = n_∥$ may be obtained. That is, the refractive index of the liquid crystal molecules 42 with respect to the red light irradiated thereon is equal to the refractive index along the long axis of each of the liquid crystal molecules. Since the refractive index along the long axis of each of the liquid crystal molecules is equal to the refractive index of the first grating layer 43, the refractive index of the liquid crystal molecules 42 to the red light irradiated thereon is also equal to the refractive index of the first grating layer 43. At this time, the first grating layer 43 cannot diffract the red light (i.e., the red light cannot pass through the liquid crystal molecules 42 and the first grating layer 43), so that the red light can be totally internally reflected in the light guide plate 3 and propagate to one end of the light guide plate 3 until it is emitted out from the one end of the light guide plate 3.

Accordingly, since the red light, the green light, and the blue light of different wavelengths are diffracted into the light guide plate 3 at different angles, and in the light guide plate 3, in a case that the propagation direction of the red light is perpendicular to the long axes of the liquid crystal molecules 42, the propagation direction of the green light or the blue light (i.e., the light of the wavelength $\lambda_{II}$ shown in FIG. 4) are not perpendicular to the long axes of the liquid crystal molecules 42. At this time, according to the refractive index formula of the liquid crystal molecules 42 with respect to the light irradiated thereon:

$$n_e = \frac{n_∥ n_⊥}{\sqrt{n_∥^2 \cos^2 θ + n_⊥^2 \sin^2 θ}},$$

the refractive index of the liquid crystal molecules 42 with respect to the green light irradiated thereon is not equal to the refractive index along the long axis of each of the liquid crystal molecules, i.e., there is a certain difference between the refractive index of the liquid crystal molecules 42 with respect to the green light irradiated thereon and the refractive index of the grating structure. At this time, the first grating layer 43 plays a role of diffraction, i.e., the grating structure extracts and filters out the green light from the light guide plate 3 and the green light may be absorbed by the light absorption layer 61. Similarly, the grating structure will extract and filter out the blue light from the light guide plate 3, so that only the red light can be output from the light guide plate 3.

In this way, only the red light is output from the light modulation device of the present embodiment. Similarly, when only the green light or the blue light is to be output from the light modulation device, an appropriate voltage may be applied across the first electrode 41 and the second electrode 44 to drive the liquid crystal molecules 42 to rotate such that the long axes of the liquid crystal molecules 42 are perpendicular to the propagation direction of the green light or the blue light. In this way, only the green light or the blue light may be output from the light modulation device.

In order to make the light totally internally reflected and transmitted in the light guide plate 3, the refractive index of the material of the light guide plate 3 may be higher than any one of the refractive index of the first grating layer, the refractive index along the long axis of each of the liquid crystal molecules 42, and the refractive index of the second grating layer (i.e., the dispersing component 2). Further, the first surface (e.g., the upper surface) and the second surface (e.g., the lower surface) of the light guide plate 3 may be flat surfaces to allow a total internal reflection and propagation of the light within the light guide plate 3.

In addition, a surface (e.g., the first surface or the second surface) at a position where the light guide plate 3 outputs the selected light may have a texture structure to destroy the total internal reflection of the light within the light guide plate 3, thereby outputting the selected light to the outside of the light guide plate 3.

In summary, the light modulation device provided in the present embodiment includes the dynamic filtering component, which receives different voltages applied to the first electrode 41 and the second electrode 44 according to the light of the selected wavelength, so as to control the liquid crystal molecules 42 to have different rotation angles. Each of the rotation angles of the liquid crystal molecules 42 corresponds to a light of a specific wavelength, so that only the light of the specific wavelength corresponding to the rotation angle of the liquid crystal molecules 42 is output from the light guide plate 3, and a wavelength of the light emitted out from the light guide plate 3 is dynamically adjustable.

According to another aspect of the present disclosure, as shown in FIGS. 1, 2, 5 and 6, a single-channel spectrum detection system is provided that includes the above-described light modulation device, and a detection device. The detection device is located on a side of the light modulation device that emits the light of the specific (i.e., selected) wavelength, and is used for detecting an object to be detected (for example, the micro fluid 9 to be detected) by using the light of the specific wavelength.

Since the single-channel spectrum detection device of the present embodiment includes the above-described light modulation device, which can select the light of a specific wavelength according to the requirement of detecting the object to be detected, and emit the light of the specific wavelength outwards. Therefore, when the single-channel spectrum detection system of the present embodiment is required for detecting a microfluid 9, the microfluid 9 merely needs to be placed in one of channels for microfluid 9, and the light modulation device is controlled to emit light of a specific wavelength corresponding to the microfluid 9. In this way, when a certain microfluid 9 is detected, the following step in the related art can be omitted: the microfluid 9 needs to be driven to move in multiple channels for microfluid 9 to reach at least one of the multiple channels that emits corresponding light of a specific wavelength. Therefore, the single-channel spectrum detection device in the present embodiment is simple in detection of the microfluid 9, and the detection result can be accurate. At the same time, it can also be seen that: the single-channel spectrum detection device in the present embodiment can detect different types of microfluids 9 by having only one channel for the microfluid 9, and the single-channel spectrum detection device has a simple structure and is easy to be realized and controlled.

In some embodiments, the detection device includes: a light diffraction component (or simply referred to as "diffraction component") 7, a detection component 11 and a single fluid channel (or simply referred to as "single-channel") respectively arranged at an end of the light guide plate 3 distal o the dispersing component 2 and/or the light source 1. The light diffraction component 7 is arranged on one of the first surface and the second surface of the light guide plate 3, the detection component and the single fluid channel are arranged on the other of the first surface and the second surface of the light guide plate 3, and the single fluid channel is arranged between the other of the first surface and the second surface of the light guide plate 3 and the detection component 11. The light diffraction component 7 collimates and emits light of a specific wavelength propagating in the light guide plate 3 to the microfluid 9. The detection component 11 is used for detecting light of the specific wavelength passing through the microfluidic 9.

That is to say, when the single-channel spectrum detection system provided by this embodiment is used for detecting the microfluid 9, the light diffraction component 7 may collimate and emit the light of a specific wavelength that propagates in the light guide plate 3 onto the microfluid 9, and then the detection component 11 is controlled to detect the light of the specific wavelength that passes through the microfluid 9, so as to obtain the performance or parameters of the microfluid 9 to be detected. The performance or parameters here may include a concentration, a light absorbance, etc. of the micro fluid 9, but the present disclosure is not limited thereto.

For example, the detection component 11 of the present embodiment may be an optical sensor capable of converting an optical signal of the light of specific wavelength passing through the microfluid 9 and received by the optical sensor into a corresponding electrical signal. At this time, the performance of the microfluid 9 can be detected by analyzing the electric signal. The optical sensor may include any one of a Charge Coupled Device (CCD), a Complementary Metal Oxide Semiconductor (CMOS) sensor, and a PIN (positive-intrinsic-negative) photodiode. However, the present disclosure is not limited thereto. For example, the detection component 11 of the present embodiment may be other sensors.

In some embodiments, as shown in FIGS. 1, 2 and 5, a side of the detection component 11 distal to the light guide plate 3 is provided with a carrier substrate 12, and the carrier substrate 12 is used for supporting the detection component 11. The carrier substrate 12 may be a glass substrate.

Furthermore, in some embodiments, the detection device further includes: a protective layer 8 covering the light diffraction component 7 for protecting the light diffraction component 7. Since the protective layer 8 covers the surface of the light diffraction component 7, the protective layer 8 should be made of a material of a lower refractive index in order to avoid the protective layer 8 having an influence on the diffractive effect of the light diffraction component 7. That is, the refractive index of the protective layer 8 should be smaller than that of the light diffraction component 7. For example, the protective layer 8 may be made of resin.

It will be appreciated that in order to ensure a non-destructive flow of the microfluid 9 in the channel for the microfluidic 9, in some embodiments, the single fluid channel includes a first hydrophobic layer 10 and a second hydrophobic layer 13 that are opposite to each other, and a channel between the first hydrophobic layer 10 and the second hydrophobic layer 13. In other words, the first hydrophobic layer 10 and the second hydrophobic layer 13 are arranged at an interval. The space between the first hydrophobic layer 10 and the second hydrophobic layer 13 is a single-channel for carrying the microfluid 9 in this embodiment.

In some embodiments, the light diffraction component 7 includes a third grating layer (i.e., a third grating). A period, a material and a type of the third grating layer may be the same as those of the second grating layer, so as to collimate and emit light of a specific wavelength propagating in the light guide plate 3 to the single-channel and the detection device. For example, the third grating layer included in the light diffraction component 7 may be a reflective grating.

In summary, since the single-channel spectrum detection system of the present embodiment includes the above-described light modulation device, and the light modulation device can dynamically adjust a wavelength of light according to the type of the microfluid 9. In this way, the single-channel spectrum detection system of the present embodiment can detect different types of microfluids 9 by only having one channel for the microfluid 9, so that the single-channel spectrum detection system provided by the present embodiment has a simple structure and is easy to implement and control. The single-channel spectrum detection system disclosed in the present disclosure can be used for food separation, bacteria separation, gene detection and the like.

It will be understood that the above embodiments are merely exemplary embodiments employed to illustrate the principles of the present disclosure, and the present disclosure is not limited thereto. ft will be apparent to one of ordinary skill in the art that various changes and modifications can be made therein without departing from the protection scope of the present disclosure as defined by the appended claims, and these changes and modifications are to be considered within the scope of the present disclosure.

What is claimed is:

1. A light modulation device, comprising:
a light guide plate;
a dispersing component configured to disperse received light into light of different wavelengths and to diffract the light of different wavelengths into the light guide plate at different angles; and
a dynamic filtering component configured to prevent light of a selected wavelength in the light guide plate from entering the dynamic filtering component such that the light of the selected wavelength emits out from the light guide plate, and to make light of non-selected wavelengths in the light guide plate enter the dynamic filtering component such that the light of the non-selected wavelengths is filtered out from the light guide plate,
wherein the dynamic filtering component comprises: a first electrode, a second electrode, a first grating layer and liquid crystal molecules, wherein the first grating layer is between the first electrode and the second electrode, and the liquid crystal molecules are filled in a gap formed by the first electrode, the second electrode and the first grating layer;
wherein the dispersing component comprises a second grating layer, and
wherein a refractive index of the light guide plate is higher than any one of a refractive index of a material of the first grating layer, a refractive index along a long axis of each of the liquid crystal molecules, and a refractive index of a material of the second grating layer.

2. The light modulation device of claim 1, wherein a period of the second grating layer is calculated by:

$$n_1 \sin \theta_1 - n_2 \sin \theta_2 = m\lambda/P$$

where $n_1$ is a refractive index of a medium where the light is located before entering the second grating layer, $n_2$ is the refractive index of the light guide plate, $\theta_1$ is an incident angle of the light with respect to the second grating layer before the light enters the second grating layer, $\theta_2$ is a diffraction angle of the light in the light guide plate, m is a diffraction order, $\lambda$ is a wavelength of any monochromatic light in the light entering the second grating layer, and P is the period of the second grating layer.

3. The light modulation device of claim 2, wherein the refractive index of the material of the first grating layer is equal to the refractive index along the long axis of each of the liquid crystal molecules.

4. The light modulation device of claim 3, further comprising: a first light absorption layer on a side of the dynamic filtering component distal to the light guide plate to absorb the light of the non-selected wavelengths in the light guide plate.

5. The light modulation device of claim 4, wherein the first light absorption layer is a black material layer.

6. The light modulation device of claim 5, wherein the light guide plate has a first surface and a second surface opposite to each other, and
the dynamic filtering component is on one of the first surface and the second surface, and the dispersing component is on the other of the first surface and the second surface and is proximal to an end of the light guide plate.

7. The light modulation device of claim 6, further comprising a second light absorption layer which is a black material layer and is on an end surface of the light guide plate proximal to the dispersing component.

8. The light modulation device of claim 7, further comprising a protective substrate between the first light absorption layer and the first electrode.

9. The light modulation device of claim 8, further comprising a first alignment layer and a second alignment layer, wherein,
the first alignment layer is on a side of the first electrode proximal to the liquid crystal molecules, the second alignment layer is on a side of the second electrode proximal to the liquid crystal molecules, and
the first grating layer is between the first alignment layer and the second alignment layer.

10. The light modulation device of claim 9, further comprising a collimated light source on a side of the dispersing component distal to the light guide plate.

11. The light modulation device of claim 1, wherein the dispersing component and the dynamic filtering component are on a same surface of the light guide plate.

12. A single-channel spectrum detection system, comprising the light modulation device of claim 1, and a detection device;
wherein the detection device is on a side of the light modulation device that emits out the light of the selected wavelength.

13. The single-channel spectrum detection system of claim 12, wherein the detection device comprises: a light diffraction component, a detection component and a single fluid channel respectively at one end of the light guide plate distal to the dispersing component;
the light diffraction component is on one surface of the first surface and the second surface of the light guide plate, the detection component and the single fluid channel are on the other surface of the first surface and the second surface of the light guide plate, the single fluid channel is between the detection component and the other surface of the light guide plate, and the light diffraction component is configured to collimate and emit the light of the selected wavelength propagating in the light guide plate onto the single fluid channel and the detection component; and
the detection component is configured to detect the light of selected wavelength passing through a microfluid in the single fluid channel.

14. The single-channel spectrum detection system of claim 13, wherein the light diffraction component comprises a third grating layer.

15. The single-channel spectrum detection system of claim 14, wherein a period of the third grating layer is equal to a period of the second grating layer.

16. The single-channel spectrum detection system of claim 15, wherein a material of each of the third grating layer and the second grating layer comprises a dielectric material or a metallic material, and a material of the first grating layer comprises a dielectric material.

17. The single-channel spectrum detection system of claim 16, wherein the single fluid channel comprises: a first hydrophobic layer and a second hydrophobic layer, wherein the first hydrophobic layer and the second hydrophobic layer are spaced apart from each other to form a channel therebetween, and
wherein the first hydrophobic layer is on a surface of the light guide plate, and the second hydrophobic layer is on a side of the detection component proximal to the light guide plate.

18. The single-channel spectrum detection system of claim 17, wherein the detection device further comprises:
a protective layer covering the light diffraction component; and
a carrier substrate on a side of the detection component distal to the light guide plate.

19. A single-channel spectrum detection system, comprising a light modulation device and a detection device;
wherein the light modulation device comprises:
a light guide plate;
a dispersing component configured to disperse received light into light of different wavelengths and to diffract the light of different wavelengths into the light guide plate at different angles; and
a dynamic filtering component configured to prevent light of a selected wavelength in the light guide plate from entering the dynamic filtering component such that the light of the selected wavelength emits out from the light guide plate, and to make light of non-selected wavelengths in the light guide plate enter the dynamic filtering component such that the light of the non-selected wavelengths is filtered out from the light guide plate;
wherein the detection device is on a side of the light modulation device that emits out the light of the selected wavelength;
wherein the detection device comprises: a light diffraction component, a detection component and a single fluid channel respectively at one end of the light guide plate distal to the dispersing component;
the light diffraction component is on one surface of the first surface and the second surface of the light guide plate, the detection component and the single fluid channel are on the other surface of the first surface and the second surface of the light guide plate, the single fluid channel is between the detection component and the other surface of the light guide plate, and the light diffraction component is configured to collimate and emit the light of the selected wavelength propagating in the light guide plate onto the single fluid channel and the detection component; and the detection component is configured to detect the light of selected wavelength passing through a microfluid in the single fluid channel.

20. The single-channel spectrum detection system of claim 19, wherein the light diffraction component comprises a third grating layer.

* * * * *